Figure 1:
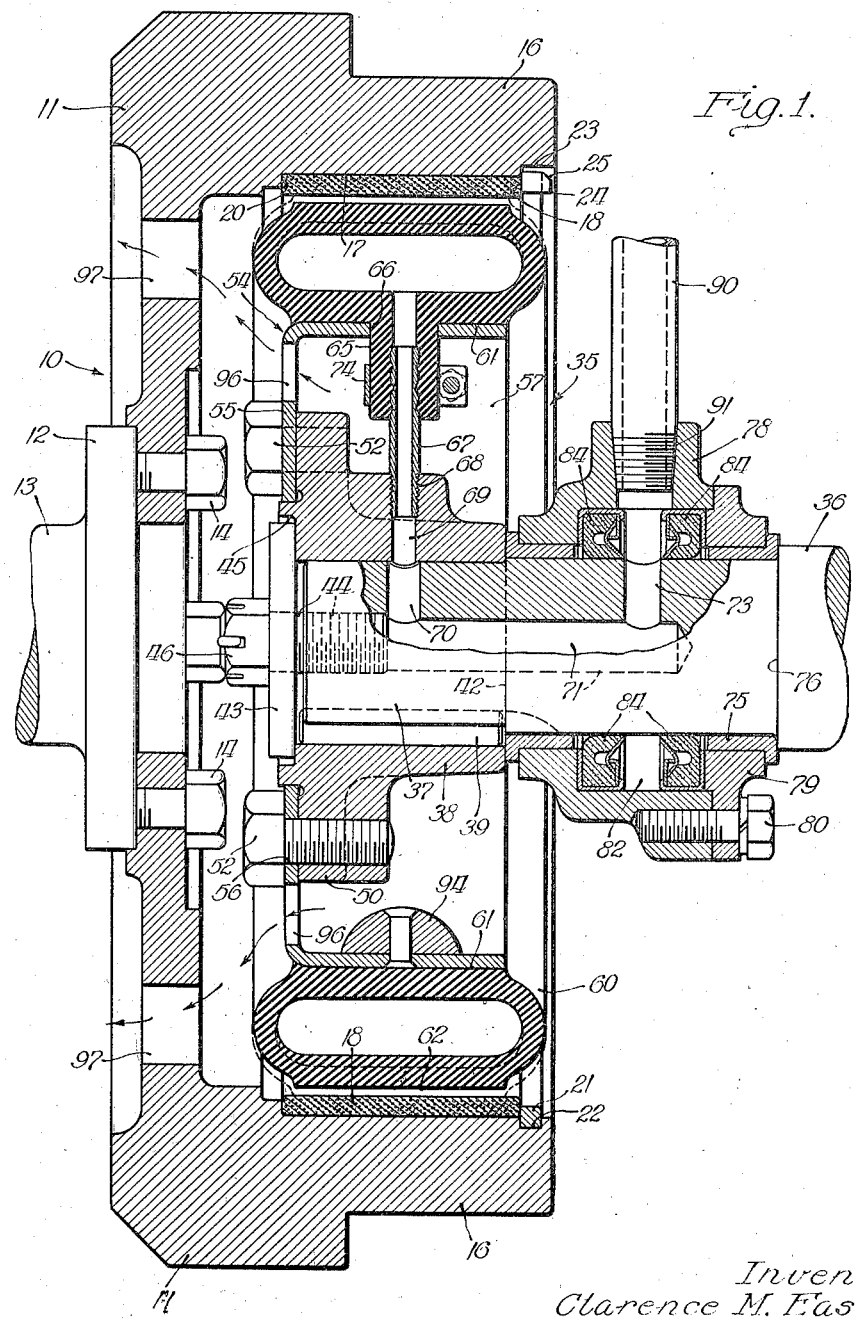

June 11, 1940.  C. M. EASON  2,203,862

CLUTCH

Filed March 25, 1937   2 Sheets-Sheet 1

Inventor:
Clarence M. Eason
By:
Brown, Jackson, Boettcher & Dienner
Attys.

June 11, 1940.  C. M. EASON  2,203,862
CLUTCH
Filed March 25, 1937   2 Sheets-Sheet 2

Inventor:
Clarence M. Eason
By: Brown, Jackson, Boettcher & Dienner
Attys.

Patented June 11, 1940

2,203,862

UNITED STATES PATENT OFFICE 2,203,862

CLUTCH

Clarence M. Eason, Waukesha, Wis., assignor to Industrial Clutch Company, Waukesha, Wis., a corporation of Wisconsin Application March 25, 1937, Serial No. 132,986

13 Claims. (Cl. 192—88)

The present invention relates generally to clutches for releasably connecting a driving shaft to a driven shaft, and has to do more particularly with clutches of the type comprising driving and driven members connected, respectively, to the driving and driven shafts and adapted for frictional engagement with an interposed coupling element, said element, when engaged with said driving and driven members, serving to transmit the drive, and when disengaged from one or both of said members providing for rotation of said driving member relative to said driven member, and without communicating such motion thereto.

Broadly, one of the objects of the present invention resides in the provision of a simple and sturdily constructed clutch of the character described, wherein either the driving or driven member is provided with means of such a nature that the coefficient of friction between such member and the coupling element will be higher than the coefficient of friction between said coupling element and the other member.

More specifically, one of the features of the present invention resides in an arrangement of clutch wherein, when the clutch is out, the coupling element is loosely carried with either the driving or driven member with which it has the lower coefficient of friction and out of engagement with the means on the other member with which it has the higher coefficient of friction, the coupling element being seized by the aforementioned means on the one driving or driven member and held thereto by the application of pressure in the initial stages of letting in the clutch whereby the desired slippage of the clutch before final seizure occurs between the coupling element and the member with which said element has the lower coefficient of friction.

Another object of the invention resides in the provision of a clutch wherein either the driving or driven member is provided with means in the nature of an inflatable toroidal member which, when inflated, expands radially outwardly to connect said members and coupling element together in the manner hereinbefore described and, when deflated, will disconnect such members and element.

Still another object of the invention resides in the provision of a clutch wherein either the driving or driven member thereof is provided with an air pressure controlled annular inflatable tube of flexible rubber-like material which, when expanded, serves to effectively connect said members and coupling element together in torque transmitting relation in the manner described, said inflatable tube being arranged with respect to said driving or driven member to take the drive entirely through the side walls thereof and thereby provide an exceedingly flexible connection between said members and coupling element so as to accommodate practically any kind of misalignment between such members and element, and, moreover, cushioning the transmission of torque so as to dampen and eliminate torsional vibration and the like.

A further object of the invention resides in providing a clutch of the character described with a coupling element in the form of a dynamically balanced ring adapted to be loosely carried by the driving or driven member of the clutch and formed of relatively loosely woven fabric which will stretch when worn and thereby maintain fairly close contact with its associated member.

A still further feature of the invention resides in the provision of simple and novel means for securing the annular inflatable tube to the driving member of the clutch.

These and other objects and advantages of the present invention will be apparent to those skilled in the art after a consideration of the following detailed description, taken in conjunction with the accompanying drawings.

Figure 2:
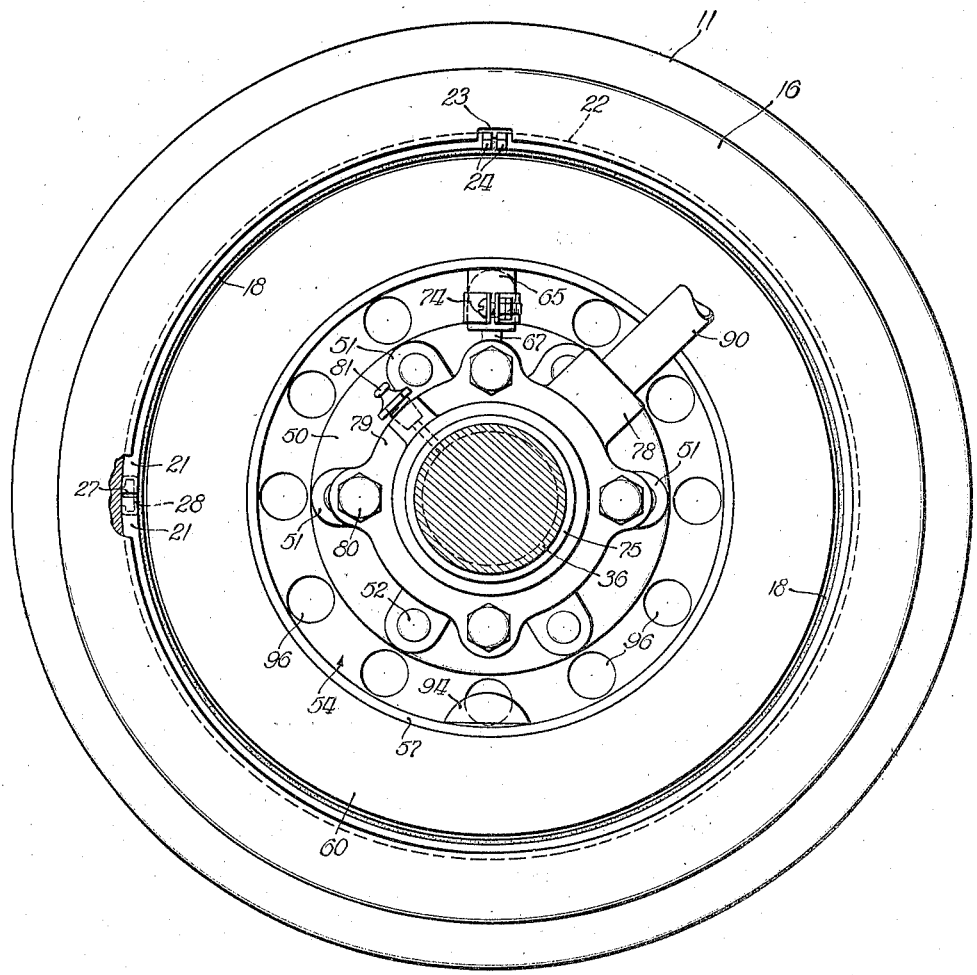

In the drawings:

Figure 1 is an axial section taken through a clutch embodying the principles of the present invention; and Figure 2 is an end view of the clutch shown in Figure 1.

Referring now to the drawings, the reference numeral 10 indicates the driving element or part, which is in the form of a flywheel 11 fastened to the flange 12 of a motor crank shaft 13 by any suitable means, such as cap screws 14. The flywheel 11 includes an overhanging flange 16 having a circular friction surface 17 against which a friction ring 18 is seated. The ring 18 is held in place between a shoulder 20 formed on the flywheel and a spring ring 21 that is seated in a groove 22 formed in the outer edge of flywheel flange 16. As best indicated in Figure 2, one edge of the groove 22 is cut out, as at 23, to provide a recess in which laterally outwardly turned ends 24 on the spring ring 21 are disposed. These ends are beveled, as at 25 in Figure 1, to provide for the insertion of a tool to remove the friction ring 18.

The friction ring 18 is formed of loosely woven friction material, similar to but softer than conventional brake lining stock. The ring 18 is preferably split, as at 27 in Figure 2, to provide for convenient installation of the ring without having to disassemble any of the clutch elements. After installation, however, it is preferable to have the ends of the ring 18 fastened together by any suitable means, such as a conventional belting fastener 28.

The driven element of the clutch is indicated in its entirety by the reference numeral 35 and comprises a driven shaft 36 having a reduced end 37 to which a clutch hub 38 is securely fastened, as by a key 39 or the equivalent. The clutch hub 38 is held up against a shoulder 42 on the shaft 36 by means of a ring or washer 43 having an opening receiving a threaded stud 44 and engaging in a recess 45 formed on the inner end of the hub 38. A nut 46 is threaded onto the stud 44 and when tightened holds the clutch hub 38 firmly against the shoulder 42.

The clutch hub 38 is provided with a radial flange 50 that has a plurality of threaded bosses 51 receiving cap screws 52 which serve to fasten a member 54 formed of pressed steel or the like and which has a radially inwardly disposed flange 55 with apertures 56 receiving the cap screws 52. The rim portion 57 of the member 54 serves as a mounting for an annular inflatable member 60 which is preferably in the nature of a pneumatic ring formed of tire stock and vulcanized, as at 61, to the outer surface of the rim 56 so as to be securely bonded thereto. The member 60 normally takes the position shown in full lines in Figure 1 and has a flattened circumferential section 62 adapted to engage the friction ring 18 when the member 60 is inflated. The member 60 has a stem 65 that extends radially inwardly through an opening 66 formed in the rim 56 and is disposed about the outer end of a pipe nipple 67, the inner end of which is threaded, as at 68, and screwed into the outer end of a bore 69 formed in the hub member 38 and which is in register with a radial duct 70 formed in the inner end of the driven shaft 36. An axial bore 71 communicates with the registering bores 69 and 70 and extends longitudinally of the driven shaft 36 to and into communication with another bore 73 formed in the driven shaft 36 outwardly of the clutch hub 38. A hose clamp 74 is disposed about the end of the stem 65 and serves to clamp the latter to the outer end of the pipe nipple in leak-tight relation.

A bushing 75 is disposed between the outer end of the clutch hub 38 and a shoulder 76 formed on the driven shaft 36. The bushing 75 is in the nature of an anti-friction member receiving a collar 78, one end of which is closed by a cap 79 fastened to the main body of the collar 78 by cap screws 80. A fitting 81 provides for convenient lubrication of the collar 78. The collar 78 and the cap 79 are constructed so as to form an interior annular chamber 82 communicating with the shaft bore 73. The ends of the chamber 82 are closed by packing elements 84 in the nature of leather cups seating against the shaft 36 in leak-tight relation. An air pipe 90 is threaded into the collar 78, as at 91, and is adapted to conduct air or other fluid under pressure into the chamber 82 and associated ducts and bores.

To balance the stem 65, pipe nipple 67, and associated parts, a counterweight 94 is riveted or otherwise secured to the rim 56, at a point diametrically opposite the stem 65. The central portion of the member 54 is provided with a plurality of openings 96, and similar openings 97 are formed in the web of the flywheel 11 for the purpose of promoting air circulation through the clutch, as indicated by the arrows.

The operation of the clutch described above is substantially as follows: When the clutch is disengaged the inflatable member 60 normally occupies the position shown in full lines, with the clutching surface 62 thereof spaced from the friction ring 18. Air under pressure controlled in any suitable manner is admitted through the pipe 90 and the bores and ducts leading to the stem 65. This air pressure expands the inflatable member 60 and causes the periphery 62 thereof to move radially outwardly into engagement with the friction ring 18. The latter is loosely mounted between the shoulder 20, the clutching surface 17, and the spring ring 24, so that at the instant of contact between the periphery 62 of the member 60 and the ring 18, the latter is gripped by the member 60 and slips along the clutching surface 17. In order to secure this action, the material of which the friction ring 18 and the inflatable member 60 are formed is so chosen as to provide a coefficient of friction between the member 60 and the ring 18 which is several times greater than the coefficient of friction between the ring 18 and the flywheel 11. Preferably, although not necessarily, the ratio is in the neighborhood of three to one. As air pressure continues to be admitted through the inlet pipe 90, the member 60 expands radially outwardly with increasing force so as to transmit increased amounts of torque from the flywheel 11 to the driven shaft 36. However, all slippage at this time occurs between the friction ring 18 and the flywheel 11, which relieves the member 60 of wear, as might occur if any slippage took place between the member 60 and the friction ring during the engaging of the clutch. As air pressure builds up within the member 60 the friction ring 18 is eventually forced radially outwardly into firm non-slipping engagement with the surface 17 of the flywheel 11, whereupon the shaft 38 will be driven at the same speed as the flywheel 11.

When firm engagement is thus established, it will be observed that there is no metallic or rigid connection of any nature whatsoever between the flywheel 11 and the driven shaft 36. If the latter is out of alignment, either radially, axially, angularly or otherwise, such misalignment is easily accommodated by the yielding of the flexible walls of the member 60. A clutch constructed according to the principles of the present invention admirably accommodates any degree of misalignment, whereas clutches having a rigid connection between the driving and driven elements are usually rendered unserviceable within a relatively short time if there should be even a small misalignment between the driving and driven parts. Any tendency for the member 60 to heat, due to the flexing of the walls thereof, is taken care of by the air circulation through the openings 96 and 97.

To release the clutch, the air pressure within the member 60 is released, or if desired, sub-atmospheric pressure may be imposed upon the interior of the member 60, so that the peripheral portion 62 thereof draws away from the friction ring 18. During this releasing operation, any slippage that occurs takes place between the friction ring 18 and the flywheel, and not between the friction ring 18 and the member 60.

Any suitable means may be provided for inflating and deflating the member 60 for engaging and disengaging the clutch. A clutch constructed according to the principles of the present invention may be employed in almost any installation where a clutch is needed. However, my clutch is particularly advantageous when used in connection with air compressor machinery, since a source of air under pressure for operating the clutch is conveniently accessible at all times.

While I have shown and described above the principal objects of the present invention, it will be apparent to those skilled in the art that my invention is not to be limited to the specific details shown and described above, but that, in fact, widely different means may be employed in the practice of the broader aspects of my invention.

What I claim, therefore, and desire to secure by Letters Patent is:

1. In a clutch adapted to connect a flywheel and a driven shaft, said flywheel having a clutching surface, the combination of a driven clutch member secured to said shaft, an inflatable member securely fastened to said driven clutch member, and a friction ring loosely seated against the clutching surface of said flywheel and having an internal diameter greater than the external diameter of said inflatable member when the latter is deflated, whereby said friction ring rotates with said flywheel, and means providing for the inflation of said inflatable member, the coefficient of friction between said inflatable member and said friction member being greater than the coefficient of friction between the friction member and said flywheel, whereby said friction member moves with said inflatable member when contact therebetween is established by the inflation thereof, further inflation of said inflatable member serving to cause said friction ring to grip the flywheel so as to transmit torque therefrom through said inflatable member to said driven member.

2. A clutch adapted to connect a flywheel to a driven shaft, comprising a driven member secured to said shaft and having a rim section, a flattened toroidal hollow member having flexible walls and securely bonded to said rim section, the outer peripheral portion of said hollow toroidal member being substantially cylindrical, and a generally cylindrical friction ring loosely carried by the flywheel normally out of contact with said hollow member, said ring being split to facilitate removal and replacement thereof about said driven shaft and into position between said toroidal member and the flywheel, and means to secure the ends of said split ring together after the ring is disposed in position about the driven shaft, the expansion of said toroidal member serving to force said friction ring into frictional engagement with said flywheel to connect the driven shaft thereto.

3. In combination, a flywheel having a generally cylindrical clutch surface adjacent its periphery and air circulating openings adjacent said surface, a driven shaft mounted coaxially of the flywheel, a driven member carried by said shaft and including a rim section having air openings therein adjacent the periphery thereof, and a pneumatically expansible ring fastened to said rim adjacent said last mentioned air openings and adapted when expanded to frictionally engage the clutch surface of the flywheel and connect the driven shaft to the latter, said air openings providing for a circulation of cooling air at points adjacent said expansible member.

4. As a means for releasably coupling a driving part to a driven part, a friction clutch comprising a driving member and a driven member, each being adapted to be connected to one of said parts, a coupling element loosely disposed between and adapted to transmit the drive between said members, means carried by one of said members for engagement with said coupling element and having a coefficient of friction with said element that is higher than the coefficient of friction between said coupling element and the other member, said coupling element being loosely carried with the member with which it has the lower coefficient of friction and being out of engagement with the means on the other member with which it has the higher coefficient when the clutch is disengaged, and means for forcing said last mentioned means radially into frictional engagement with said coupling element so as to connect said clutch members through said coupling element and the means engageable therewith.

5. The combination of claim 4 wherein the driving and driven members are concentric and the coupling element comprises a dynamically balanced expansible ring.

6. The combination of claim 4 wherein the means carried by one of said members for engagement with said coupling element comprises an elastic inflatable ring.

7. The combination of claim 4 wherein the means carried by one of said members comprises an elastic inflatable ring having a rubber friction surface for engaging the coupling element and the coupling element comprises a dynamically balanced expansible ring of fabric of relatively loose weave.

8. The combination of claim 4 wherein the coupling element comprises a dynamically balanced expansible ring formed from a single length of material and having its outer and inner surfaces directly engageable by one of said driving or driven members and the means carried by the other of said members, respectively.

9. In a clutch adapted to connect a flywheel and a driven shaft, said flywheel having a clutching surface, the combination of a driven clutch member secured to said shaft, an inflatable member securely fastened to said driven clutch member, and a friction ring loosely seated against the clutching surface of said flywheel and having an internal diameter greater than the external diameter of said inflatable member when the latter is deflated, whereby said friction ring rotates with said flywheel, and means providing for increasing the pressure within said member to expand the same and cause said friction ring to grip the flywheel so as to transmit torque therefrom through said inflatable member to said driven member.

10. A clutch comprising driving and driven members, a hollow expansible ring having flexible side walls and securely fastened to one of said members, an annulus disposed between the other member and said ring, said annulus being separate from said ring and having a diameter more nearly equal to the diameter of the adjacent portion of said other member than is the diameter of the adjacent portion of said ring, whereby said annulus normally rotates with said other member, expansion of said ring serving to force the annulus into engagement with the other member to connect said driving and driven members together, and means for expanding said ring to connect said driving and driven members.

11. A clutch adapted to connect a flywheel to a driven shaft, comprising a light weight pressed metal driven member secured to said shaft and having a rim section, a flattened toroidal hollow member having flexible walls and securely bonded to said rim section, the outer peripheral portion of said hollow toroidal member being substantially cylindrical, and a generally cylindrical friction ring loosely carried by the flywheel normally out of contact with said hollow member, the expansion of said toroidal member serving to force said friction ring into frictional engagement with said flywheel to connect the driven shaft thereto.

12. A clutch comprising driving and driven members, a hollow pneumatically expansible ring having flexible side walls and securely fastened to one of said members, an annulus disposed between the other member and said ring and normally out of contact with the latter, expansion of said ring serving to engage and force the annulus radially into engagement with the other member to connect said driving and driven members together, and means providing increasing the internal pressure in said hollow member to expand the same and connect said driving and driven members.

13. In a clutch adapted to connect a driving part to a driven part spaced apart radially, an inflatable member securely fastened to one of said parts, the other part having a clutching surface adjacent said inflatable member, and a friction ring seated adjacent said clutching surface and having a diameter such that the friction ring tends to rotate with the radially outer of said parts, the coefficient of friction for said inflatable member and said friction ring being greater than the coefficient of friction for said inflatable member and said other part, whereby relative movement takes place between said friction ring and said other part when the clutch is engaged, and means providing for the inflation of said inflatable member, said means including a slip connection to accommodate rotation of said one part, inflation of said inflatable member serving to cause said friction ring to grip said surface so as to transmit torque from the driving and driven parts through said inflatable member.

CLARENCE M. EASON.